L. CASWELL.
Corn-Planter.
No. 9,894. Patented Aug. 2, 1853.
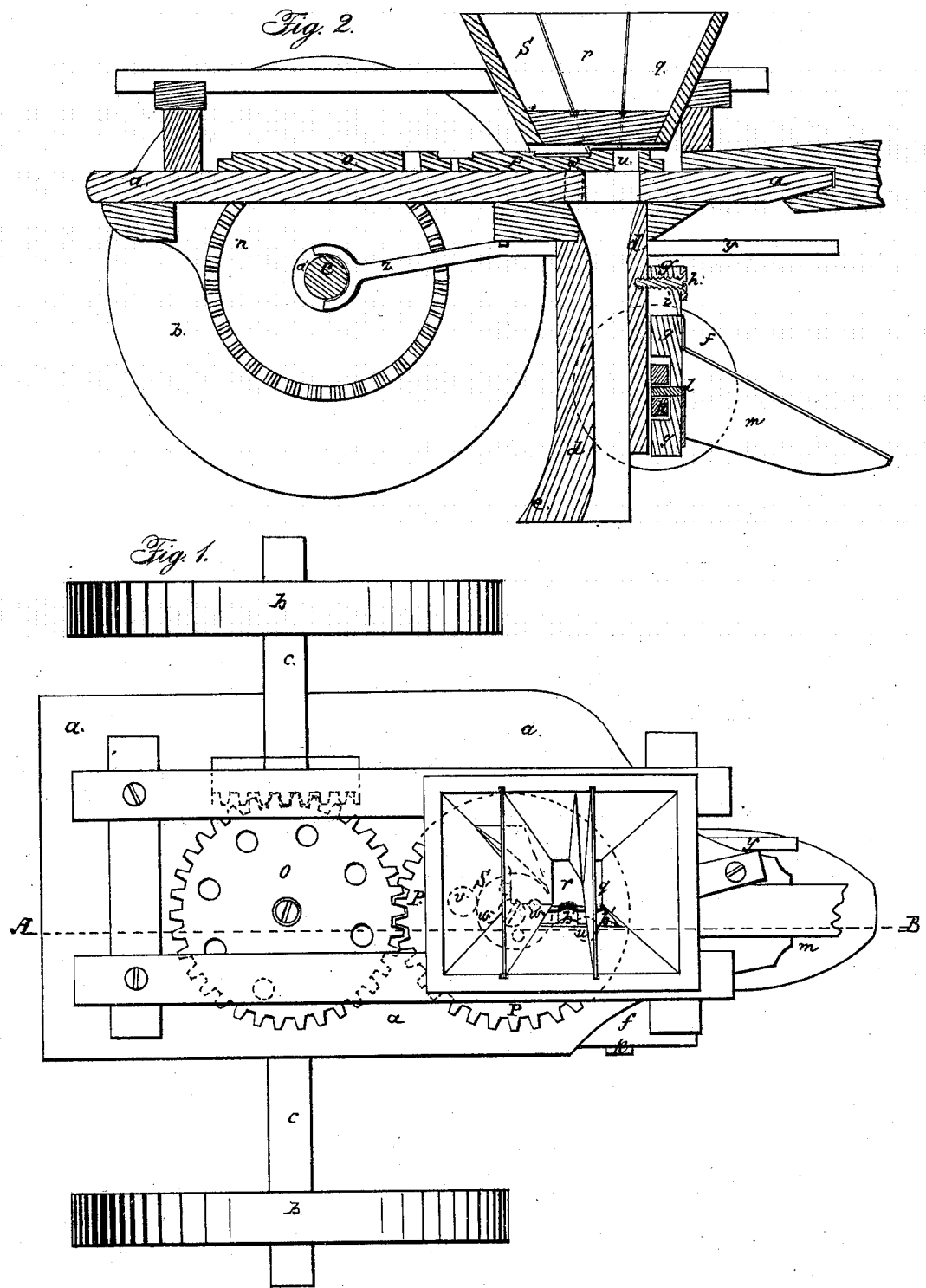

UNITED STATES PATENT OFFICE.

LEBBEUS CASWELL, OF HARRISON, MAINE.

IMPROVEMENT IN SEED-PLANTERS.

Specification forming part of Letters Patent No. 9,894, dated August 2, 1853.

*To all whom it may concern:*

Be it known that I, LEBBEUS CASWELL, of Harrison, in the county of Cumberland and State of Maine, have invented certain new and useful Improvements in Seed-Planting Machines; and I do hereby declare that the following description, taken in connection with the accompanying drawings, hereinafter referred to, forms a full and exact specification of the same, wherein I have set forth the nature and principles of my said improvements, by which my invention may be distinguished from others of a similar class, together with such parts as I claim and desire to have secured to me by Letters Patent.

The figures of the accompanying plate of drawings represent my improvements.

Figure 1 is a plan or top view of my seed-planter. Fig. 2 is a longitudinal vertical section of the same, taken in the plane of the line A B, Fig. 1.

An essential feature of my improvements consists in an arrangement for gaging the depth to which the plow of the machine enters the ground before the seed is dropped, so as to plant deep or near the surface, as may be desirable. This result is effected by wheels which support the plow, these wheels being attached to an adjustable slide, so as to be raised or lowered, and also so arranged as to prevent any ordinary obstruction or inequality in the ground from varying the distance which the plow enters, as much uniformity as possible being necessary in the depth to which the seed is planted.

$a\ a\ a$ in the drawings represent the carriage or frame-work of the machine, resting upon the large wheels $b\ b$, which turn with the shaft or axle $c\ c$. Near the rear end of the carriage is the spout $d\ d$, through which the seeds are dropped, as will be hereinafter explained. The end of this spout terminates in the plow $e$. The gage-wheels $f\ f$ are attached to the adjustable slide $g\ g$, which is raised or lowered and then fastened at any desired height by the set-screw $h$, there being a slot, $i$, for the purpose in the slide $g\ g$. The axle $k$ of the gage-wheels $f f$ turns at its center on a fulcrum, $l$, so that in case either wheel meets with any inequality in the ground the said wheel will rise or fall (the axle turning on its fulcrum, as above described) without producing any corresponding rise or fall in the plow, which is thus made to operate at a uniform depth. The hill is covered, after the seed is dropped, by the coverer $m$, attached to the slide $g\ g$.

On the axle $c\ c$ is placed the vertical gear-wheel $n$, which gives motion to the gear-wheel $o$, placed on the carriage $a\ a\ a$. This wheel gives motion to the gear-wheel or plate $p$, placed directly over the spout $d\ d$ and under the compartments $q\ r\ s$ of the hopper. This wheel is pierced with two large holes, $u\ v$, and the small holes $w\ w$, &c., which are so placed with regard to the center of the wheel $p$ as to pass, one after the other, as the said wheel revolves, under the compartments $q\ r\ s$, each of which communicates with the spout $d\ d$. When the carriage is moved along by hand or horse power, as may be desirable, motion is given to the wheel $p$, as above described, and the several parts $q\ r\ s$ of the hopper being filled with as many kinds of seed, it will be seen that the hole $u$ will first be brought over the spout $d\ d$ and the seed from the compartment $q$ dropped through the same into the ground prepared by the plow $e$. After this seed is covered by the coverer $m$ the hole $v$ which communicates with the compartment $r$ will be brought over the spout and the seed in the said compartment $r$ deposited in the next hill. In the same way the small holes $x\ x$, &c., are then brought over the spout and garden-seed or plaster deposited.

From the above description it will be seen that different kinds and sizes of seeds can be planted alternately in separate hills at the same operation.

The wheel $n$ is disconnected at pleasure from the gear $o$ by the rod $y$, the forked end $z$ of which operates the sliding journal $a'$ of the said wheel $n$. The several holes of the wheel are prevented from being obstructed by brushes $b'\ b'$, attached to the bottom of the hopper. When potatoes are to be planted knives are used in the place of the brushes for the same purpose, and when the seed is to be planted in drills the wheel $o$ is exchanged for the wheel $p$. When pumpkin or similar seeds are to be planted with corn, &c., an additional wheel is placed upon the carriage, the wheel $p$ being so arranged with regard to this additional wheel as to bring their outer edges, near which the holes are made, under the hopper and over the spout. It will be seen that by varying the relative position and size of the apertures in the plate $p$ the seeds can be planted at any distance apart.

Having thus described my improvements in seed-planting machines, what I claim as my invention, and desire to have secured to me by Letters Patent, is—

Placing the axle of the gage-wheels on a fulcrum in an adjustable slide, as above described, so as to plant at any desired and at the same time a uniform depth, as above set forth.

LEBBEUS CASWELL.

Witnesses:
  JOEL GILES,
  JOSEPH GAVETT.